US012496519B2

(12) United States Patent
Williams et al.

(10) Patent No.: US 12,496,519 B2
(45) Date of Patent: Dec. 16, 2025

(54) THEREMIN-BASED TRACKING AND TRIGGERING

(71) Applicant: UNIVERSAL CITY STUDIOS LLC, Universal City, CA (US)

(72) Inventors: Thomas Owen Williams, Orlando, FL (US); Brandon David Burnette, Bethlehem, PA (US); Patrick John Goergen, Orlando, FL (US)

(73) Assignee: Universal City Studios LLC, Universal City, CA (US)

( * ) Notice: Subject to any disclaimer, the term of this patent is extended or adjusted under 35 U.S.C. 154(b) by 350 days.

(21) Appl. No.: 17/947,488

(22) Filed: Sep. 19, 2022

(65) Prior Publication Data

US 2023/0090805 A1   Mar. 23, 2023

Related U.S. Application Data

(60) Provisional application No. 63/246,206, filed on Sep. 20, 2021.

(51) Int. Cl.
 *A63F 13/40* (2014.01)
 *G06F 3/01* (2006.01)
 *G06F 3/0346* (2013.01)
(52) U.S. Cl.
 CPC .............. *A63F 13/40* (2014.09); *G06F 3/012* (2013.01); *G06F 3/0346* (2013.01)
(58) Field of Classification Search
 CPC ......... A63F 13/40; G06F 3/012; G06F 3/0346
 See application file for complete search history.

(56) References Cited

U.S. PATENT DOCUMENTS 8,482,859 B2   7/2013  Border et al.
9,648,416 B2   5/2017  Davis
         (Continued)

FOREIGN PATENT DOCUMENTS

DE   102009014991 A1   8/2012
EP       2503436 A1   9/2012
EP       3022580 A1   5/2016

OTHER PUBLICATIONS

Translation of DE 102009014991 A1, original filing date Mar. 26, 2009, European Patent Office, downloaded on Mar. 20, 2025. (Year: 2009).*

(Continued)

*Primary Examiner* — Werner G Garner
(74) *Attorney, Agent, or Firm* — Fletcher Yoder, P.C.

(57) ABSTRACT

Aspects of the disclosure relate to methods, apparatus, and systems for tracking a presence of a body part via a theremin-based sensor and outputting a usable signal. For example, a tracking system includes a signal processor and a theremin circuit including at least one antenna. The theremin circuit detects a varying position of a body part relative to the at least one antenna and outputs an analog signal to the signal processor having a varying frequency or amplitude based on the varying position of the body part relative to the at least one antenna. The digital processor determines a rate of change of the varying frequency or amplitude of the analog signal, determines at least a velocity of the body part based on the rate of change, and outputs a digital signal corresponding to at least the velocity to a system or device coupled to the theremin-based tracking system.

26 Claims, 6 Drawing Sheets

(56) References Cited

U.S. PATENT DOCUMENTS

| | | |
|---|---|---|
| 10,539,787 B2 | 1/2020 | Haddick et al. |
| 2007/0100666 A1 | 5/2007 | Stivoric et al. |
| 2017/0090640 A1 | 3/2017 | Roberts et al. |

OTHER PUBLICATIONS

International Search Report and Written Opinion—PCT/US2022/044121—ISA/EPO—Mar. 15, 2023.

* cited by examiner

THEREMIN-BASED TRACKING AND TRIGGERING

CROSS-REFERENCE TO RELATED APPLICATION

This application claims priority to and the benefit of U.S. Provisional Application Ser. No. 63/246,206 entitled "THEREMIN-BASED TRACKING AND TRIGGERING" filed on Sep. 20, 2021, the entire contents of which is incorporated herein by reference as if fully set forth below in its entirety and for all applicable purposes.

TECHNICAL FIELD

The present disclosure generally relates to systems for sensing a presence/motion of a body part (e.g., person's hand), and more particularly, to tracking the presence/motion of the body part via a theremin-based sensor and outputting a usable signal.

INTRODUCTION

Current hand tracking (and/or body tracking) systems implemented in an amusement park ride vehicle or interactive attraction may not be ideal for detecting the presence or motion of a person's hand. For example, because the current hand tracking systems utilize a camera (or other optical-based sensor) to track hand presence/motion, the current systems require a direct line of sight with the person's hand to sense the presence/motion. As such, the hand tracking fails if the person's hand cannot be seen by the camera.

Accordingly, the present disclosure is directed to a system for tracking a presence or motion of a person's hand (and/or body) using a theremin-based sensing device. The theremin-based sensing device allows the system to sense hand presence/motion without requiring a direct line of sight with the person's hand.

BRIEF SUMMARY OF SOME EXAMPLES

The following presents a summary of one or more aspects of the present disclosure, in order to provide a basic understanding of such aspects. This summary is not an extensive overview of all contemplated features of the disclosure, and is intended neither to identify key or critical elements of all aspects of the disclosure nor to delineate the scope of any or all aspects of the disclosure. Its sole purpose is to present some concepts of one or more aspects of the disclosure in a simplified form as a prelude to the more detailed description that is presented later.

Aspects of the disclosure relate to methods, apparatus, and systems for tracking a presence of a body part via a theremin-based sensor and outputting a usable signal. Other aspects, embodiments, and features are also claimed and described.

In an example, a theremin-based tracking system is disclosed. The system includes a signal processor and a theremin circuit including at least one antenna. The theremin circuit is configured to detect a varying position of a body part relative to the at least one antenna, and output to the signal processor an analog signal having a varying frequency or amplitude based on the varying position of the body part relative to the at least one antenna. The signal processor is configured to determine a rate of change of the varying frequency or amplitude of the analog signal, determine at least a velocity of the body part based on the rate of change, and output a digital signal corresponding to at least the velocity to another system or device coupled to the signal processor. The system may further include a cable made of a conductive material and positioned in parallel to the at least one antenna, wherein the cable is insulated from the theremin circuit, the signal processor, and the at least one antenna, and wherein the at least one antenna wirelessly attenuates to the cable. The system may also include a water medium filled with water, wherein the cable is inserted in the water medium, and the at least one antenna wirelessly attenuates to the cable inserted in the water medium.

In an example, a method of tracking a body part is disclosed. The method includes detecting, via a theremin circuit, a varying position of a body part relative to at least one antenna, outputting, from the theremin circuit to a signal processor, an analog signal having a varying frequency or amplitude based on the varying position of the body part relative to the at least one antenna, determining, via the signal processor, a rate of change of the varying frequency or amplitude of the analog signal, determining, via the signal processor, at least a velocity of the body part based on the rate of change, and outputting, from the signal processor, a digital signal corresponding to at least the velocity to another system or device coupled to the signal processor.

DETAILED DESCRIPTION

Figure 1:
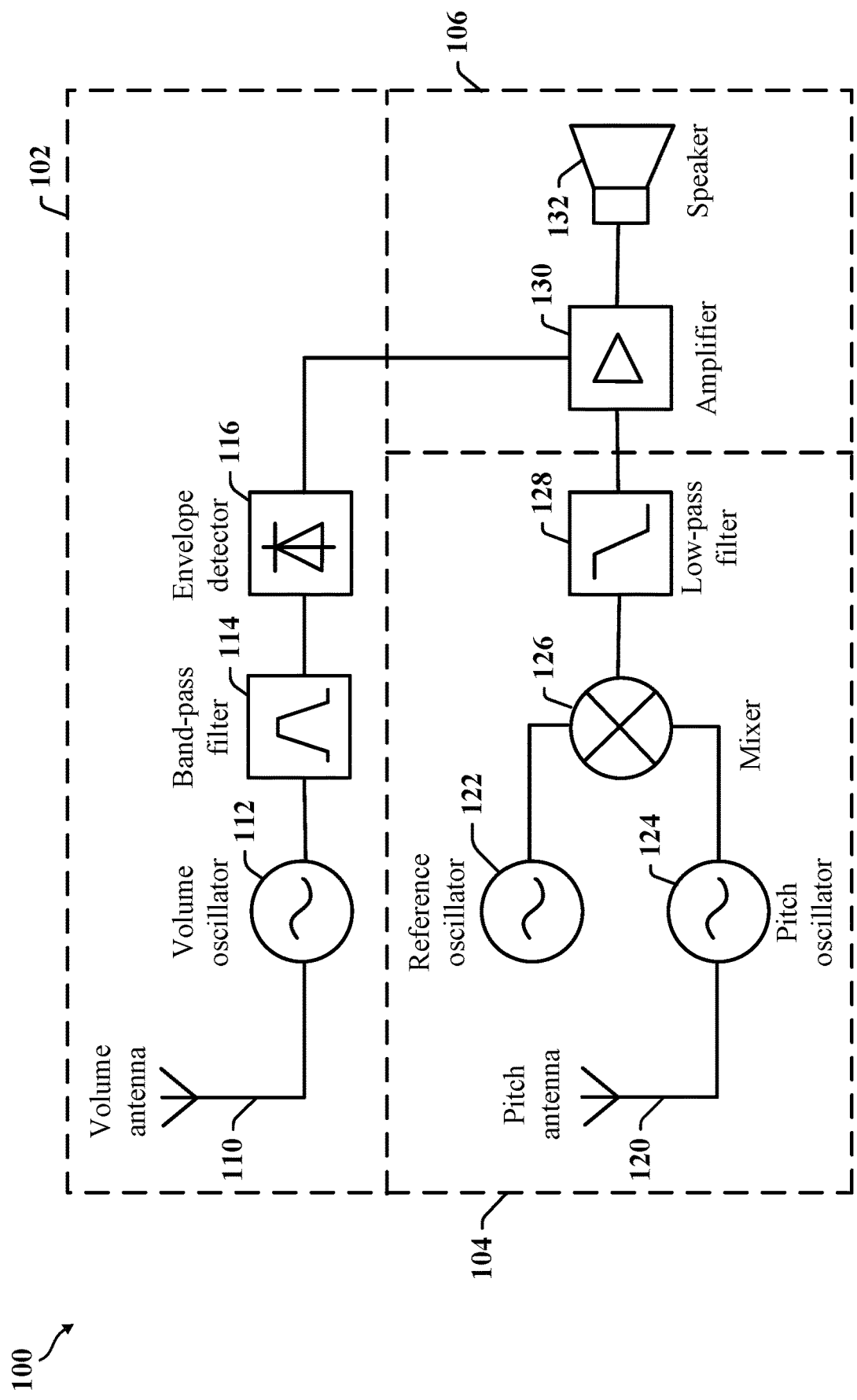
FIG. 1 is a block diagram of an example theremin circuit.

The detailed description set forth below in connection with the appended drawings is intended as a description of various configurations and is not intended to represent the only configurations in which the concepts described herein may be practiced. The detailed description includes specific details for the purpose of providing a thorough understanding of various concepts. However, it will be apparent to those skilled in the art that these concepts may be practiced without these specific details. In some instances, well known structures and components are shown in block diagram form in order to avoid obscuring such concepts. While aspects and embodiments are described in this application by illustration to some examples, those skilled in the art will understand that additional implementations and use cases may come about in many different arrangements and scenarios. Innovations described herein may be implemented across many differing platform types, devices, systems, shapes, sizes, and/or packaging arrangements.

The present disclosure relates to tracking hand (or body) presence/motion via a theremin-based sensing device and outputting a usable signal (e.g., used for an amusement park game or interactive attraction). Theremin technology may operate based on changes in frequency and/or amplitude of frequency that may be induced in a signal when a certain object (e.g., a person's hand) is proximate to a capacitive electrode.

Traditionally, a theremin is an electronic musical instrument controlled without physical contact by a person operating the theremin. The theremin may include two metal antennas that sense the relative position of the person's hands and control oscillators for varying the frequency (pitch) of a signal via one hand and the amplitude of the frequency (volume) via the other hand. The theremin uses electromagnetic fields to output analog signals of varying frequency (pitch) and amplitude (volume) depending on where the person's hands are placed relative to the two antennas on the theremin. Electric analog signals from the theremin may be processed (e.g., amplified) and sent to a loudspeaker to output an audible signal.

In an aspect, in addition to outputting an audible signal, the electric analog signals of varying frequency and/or amplitude output from the theremin may be processed into digital data usable for other applications. For example, a processor may process the analog signals from the theremin and output digital data that may be provided to an electronic game played by the person controlling the theremin or used to trigger an interactive attraction. In an aspect, the digital data may be positioning data of the person's hand relative to one or more of the theremin antennas for tracking hand movement (e.g., X and Y coordinates), which may then be output to the electronic game or interactive attraction.

In an aspect, a theremin-based tracking system (or device) including a theremin circuit and a signal processor (which may be part of the theremin circuit) may be built into an amusement park ride vehicle lap bar and themed accordingly. In another aspect, the theremin-based tracking system may be a standalone device within an attraction or interactive area of the amusement park. In a further aspect, the theremin-based tracking system allows for the tracking of a person's hand (or body) using electromagnetics without using a camera-based system. Thus, the theremin-based tracking system may perform the hand (or body) tracking without requiring a direct line of sight with the person's hand (or body), as required by the camera-based system.

In an aspect, signals from the theremin-based tracking system may wirelessly attenuate to a cable not physically connected to the signal processor, the theremin circuit and/or the antennas. Accordingly, the theremin-based tracking system may wirelessly attenuate from an antenna coupled to the theremin circuit (e.g., circuit board) to a cable (e.g., HDMI cable, Ethernet cable, or any other cable made of conductive material). Through the cable, the theremin-based tracking system may be triggered to output a usable signal, such as to move a virtual element in a video game (e.g., throw a virtual ball) via software, trigger/enable an effect of an interactive attraction (e.g., shoot water cannon), or trigger an alarm or safety system.

In a further aspect, the cable may interact with a water medium to facilitate triggering of the tracking system. For example, the cable (e.g., HDMI cable) may be inserted into a bucket of water. Accordingly, as the theremin-based tracking system wirelessly attenuates to the cable inserted in the bucket of water, a person may physically put his/her hand in the bucket of water, or near the water, to cause the theremin-based tracking system to be triggered.

FIG. 1 is a block diagram of an example theremin circuit 100. Volume (i.e., amplitude of frequency) control is conducted via an amplitude control circuit 102. Pitch (i.e., frequency) control is conducted via a frequency control circuit 104. Audio output is controlled via an output control circuit 106.

The theremin circuit 100 may be operated by a person without physical contract. The person near the theremin circuit 100 may move his/her hands in the proximity of two metal antennas 110, 120. The distance from a pitch antenna 120 (or frequency antenna 120) controls pitch (frequency), and the distance from a volume antenna 110 (or amplitude antenna 110) controls volume (amplitude). Narrower frequency waves (higher notes) may be generated when the person's hand moves closer to the pitch antenna 120. Taller amplitude waves (louder notes) may be generated when the person's hand moves away from the volume antenna 110.

In an aspect, the theremin circuit 100 may use the heterodyne principle to generate an audio signal. The frequency control circuit 104 may include includes two radio frequency oscillators 122, 124 set below 500 kHz to minimize radio interference. A reference oscillator 122 operates at a fixed frequency. The frequency of a pitch oscillator 124 is almost identical, and is controlled by the person's distance from the pitch antenna 120.

The person's hand acts as the grounded plate (the person's body being the connection to ground) of a variable capacitor in an L-C (inductance-capacitance) circuit, which is part of the pitch oscillator 124 and determines its frequency. In some implementations, the pitch antenna 120 is directly coupled to the tuned circuit of the pitch oscillator 124 and the "pitch field", that is the change of note with distance, is highly nonlinear, as the capacitance change with distance is far greater near the pitch antenna 120. In such implementations, when the pitch antenna 120 is removed, the pitch oscillator 124 moves up in frequency.

To partly linearize the pitch field, the pitch antenna 120 may be wired in series with an inductor to form a series tuned circuit, resonating with the parallel combination of the antenna's intrinsic capacitance and the capacitance of the person's hand in proximity to the pitch antenna 120. This series tuned circuit is then connected in parallel with the parallel tuned circuit of the variable pitch oscillator 124. With the antenna circuit disconnected, the pitch oscillator 124 is tuned to a frequency slightly higher than the stand-alone resonant frequency of the antenna circuit. At that frequency, the pitch antenna 120 and its linearization coil present an inductive impedance; and when connected, behaves as an inductor in parallel with the pitch oscillator 124. Thus, connecting the pitch antenna 120 and linearizing coil raises the oscillation frequency. Close to the resonant frequency of the antenna circuit, the effective inductance is small, and the effect on the pitch oscillator 124 is greatest; farther from it, the effective inductance is larger, and fractional change on the pitch oscillator 124 is reduced.

When the hand is distant from the pitch antenna 120, the resonant frequency of the antenna series circuit is at its highest; i.e., it is closest to the free running frequency of the pitch oscillator 124, and small changes in antenna capacitance have greatest effect. Under this condition, the effective inductance in the tank circuit is at its minimum and the oscillation frequency is at its maximum. The steepening rate of change of shunt impedance with hand position compensates for the reduced influence of the hand being further away. With careful tuning, a near linear region of pitch field can be created over the central 2 or 3 octaves of operation. Using optimized pitch field linearization, circuits can be made where a change in capacitance between the person and the theremin circuit in the order of 0.01 picofarads produces a full octave of frequency shift.

A mixer 126 produces the audio-range difference between the frequencies of the two oscillators 122, 124 at each moment, which is the tone that is then wave shaped (via a low-pass filter 128), and amplified (via an amplifier 130) and sent to a loudspeaker 132 of the output control circuit 106.

To control volume, the person's other hand acts as the grounded plate of another variable capacitor. As in the frequency control circuit 104, in the amplitude control circuit 102, the distance between the person's hand and the volume antenna 110 determines the capacitance and hence natural resonant frequency of an LC circuit inductively coupled to another fixed LC oscillator circuit operating at a slightly higher resonant frequency. When a hand approaches the volume antenna 110, the natural frequency of that circuit is lowered by the extra capacitance, which detunes a volume oscillator 112 and lowers its resonant plate current. In some aspects, the RF plate current of the volume oscillator 112 may be picked up by another winding and used to power the filament of another diode-connected triode, which thus acts as a variable conductance element changing the output amplitude. A signal output from the volume oscillator 112 may be passed through a band-pass filter 114 and an envelope detector 116 prior to being forwarded to the amplifier 130.

As shown in FIG. 1, the output control circuit 106 receives signals from the amplitude control circuit 102 and the frequency control circuit 104 to output an audible signal. However, it is contemplated that in some aspects, the output control circuit 106 may also be configured to process the signals received from the amplitude control circuit 102 and/or the frequency control circuit 104 to output digital data usable for other applications (e.g., amusement park game, interactive attraction, safety system, etc.).

Figure 2:
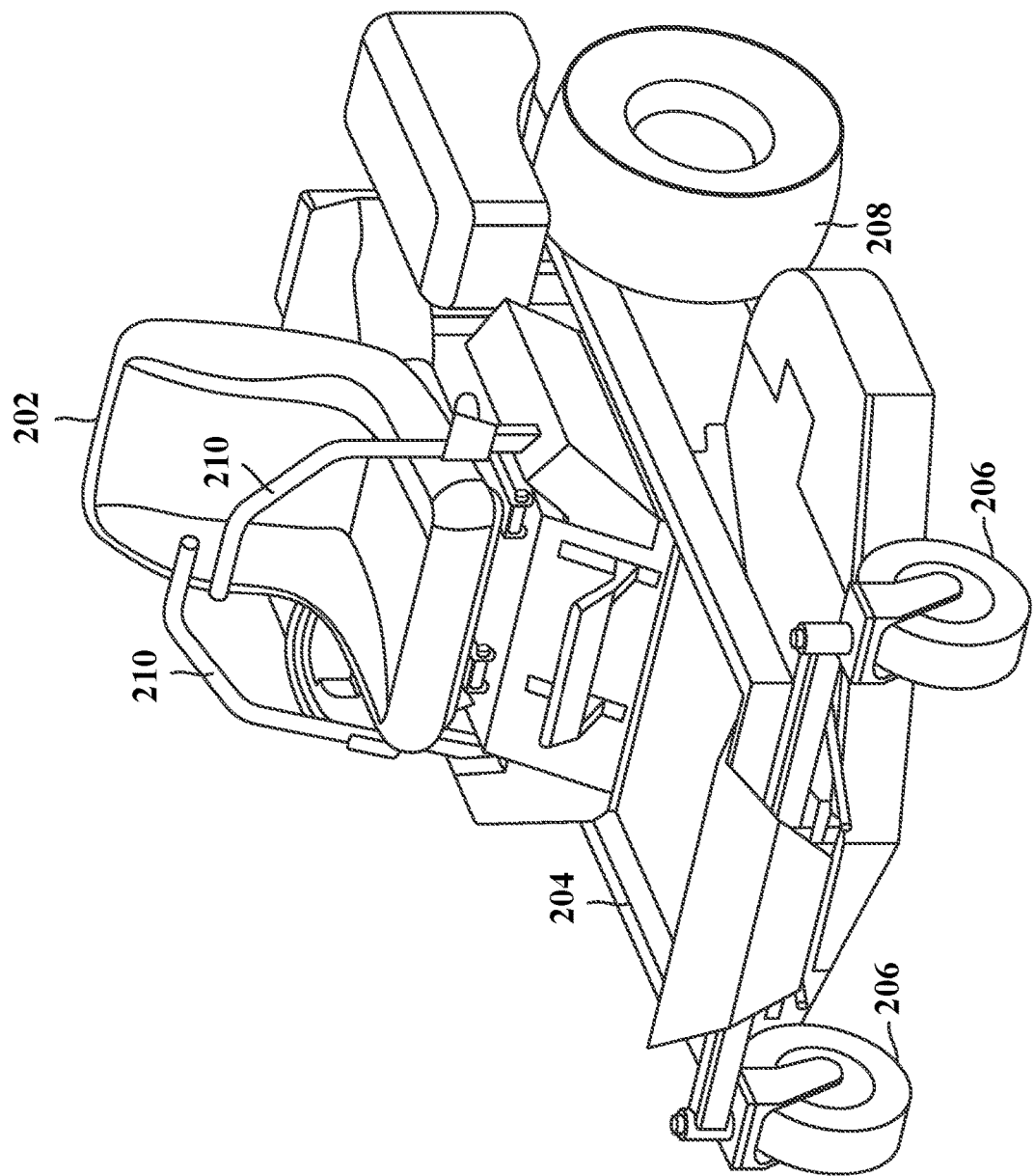
FIG. 2 illustrates an example ride vehicle implementing a theremin-based tracking system according to an aspect of the present disclosure.

FIG. 2 illustrates an example ride vehicle 200 implementing a theremin-based tracking system according to an aspect of the present disclosure. The ride vehicle 200 may include a seat 202 in which a person operating the ride vehicle 200 may sit. The ride vehicle 200 may further include a frame 204 for supporting the seat 202, as well as front wheels 206 and rear wheels 208 for facilitating movement of the ride vehicle 200. The ride vehicle 200 may also include lap bars 210 extending from a lower surface of the ride vehicle 200 below the seat 202. In an aspect, the lap bars 210 may be movably positioned to rest above the person's lap when the person is sitting in the seat 210. The lap bars 210 may serve to safely restrain the person from falling out of the seat 202 when the ride vehicle 200 is moving. Additionally, or alternatively, the lap bars 210 may serve as mechanisms to control movement of the ride vehicle 200 or any other effect associated with the ride vehicle 200. As shown in FIG. 2, the lap bars 210 are two separate elements. However, in some aspects, a single lap bar 210 extending from a lower surface of the ride vehicle 200 below the seat 202, or from a higher surface, may be implemented to be movably positioned above the lap of the person sitting in the seat 202.

In an aspect, a way in which antennas of a theremin-based tracking system are used may depend on the number of antennas enabled in the system. For example, if both a frequency antenna (for sensing frequency changes) and an amplitude antenna (for sensing amplitude changes) are enabled, then either one of the antennas can be used to determine how fast a signal is changing. If the amplitude antenna is enabled, then the theremin-based tracking system can determine how short or tall a wave (signal) becomes and the rate at which the wave changes (becomes shorter or taller). If the frequency antenna is enabled, then the theremin-based tracking system can determine how narrow or wide the wave (signal) becomes and the rate at which the wave changes (narrows or widens).

In an aspect, a frequency antenna (e.g., frequency antenna 120) and/or an amplitude antenna (e.g., amplitude antenna 110) of the theremin-based tracking system may be implemented in the lap bar 210 of the ride vehicle 200. Accordingly, hand motion can be sensed based on how the person in the seat 202 moves his/her hand while he/she is sitting in the seat 202. The theremin circuit (via the antennas) can sense where the hand is in space and output a corresponding signal to a signal processor (e.g., digital processor) coupled to, or part of, the theremin circuit. The signal processor may then process the corresponding signal to output digital data usable for different applications. For example, the digital data may be used to trigger a safety system if the theremin-based tracking system is used to detect whether the person remains seated in the seat 202. In other examples, the digital data may be used in a game being displayed on a screen, to activate an interactive element of the ride vehicle 200 or other attraction, or to trigger an effect from an effects engine.

In an aspect, the input for the theremin circuit may be interference from any conductive material. Thus, the lap bar 210 itself may serve as an antenna or "tracker" of the theremin circuit. Other objects made of conductive material, such as door handles, doorways, etc., may also be used as an antenna. As such, the theremin-based tracking system may not only be used to track hand gestures, but also to track gestures from any body part in general. For example, any body part (e.g., leg, thigh, head, arm, etc.) that interacts with the theremin-based tracking system may cause the system to be triggered. Accordingly, the theremin-based tracking system may be used to track a person walking through a doorway or sitting in a seat without needing a camera or other optical-based sensor.

In an aspect, the signal processor may be an Arduino or any other type of processing circuit. The signal processor includes code or instructions configured to receive data from the theremin circuit (e.g., changes in the attenuation of a signal; changes in the frequency or amplitude of a wave, etc.) and converts the theremin circuit data into data (e.g., digital data) usable for other applications. The signal processor may send the usable data over a transport medium (e.g., USB, Ethernet, etc.) to a system or device for use in an application (e.g., video game, interactive attraction, etc.) being executed thereon.

In an aspect, the theremin circuit generates a signal and determines the manipulation of the signal. The signal processor is configured to digitize signals from the theremin circuit and send the digitized signals to a game or other system (e.g., interactive attraction) that the signal processor interfaces with.

Figure 3:
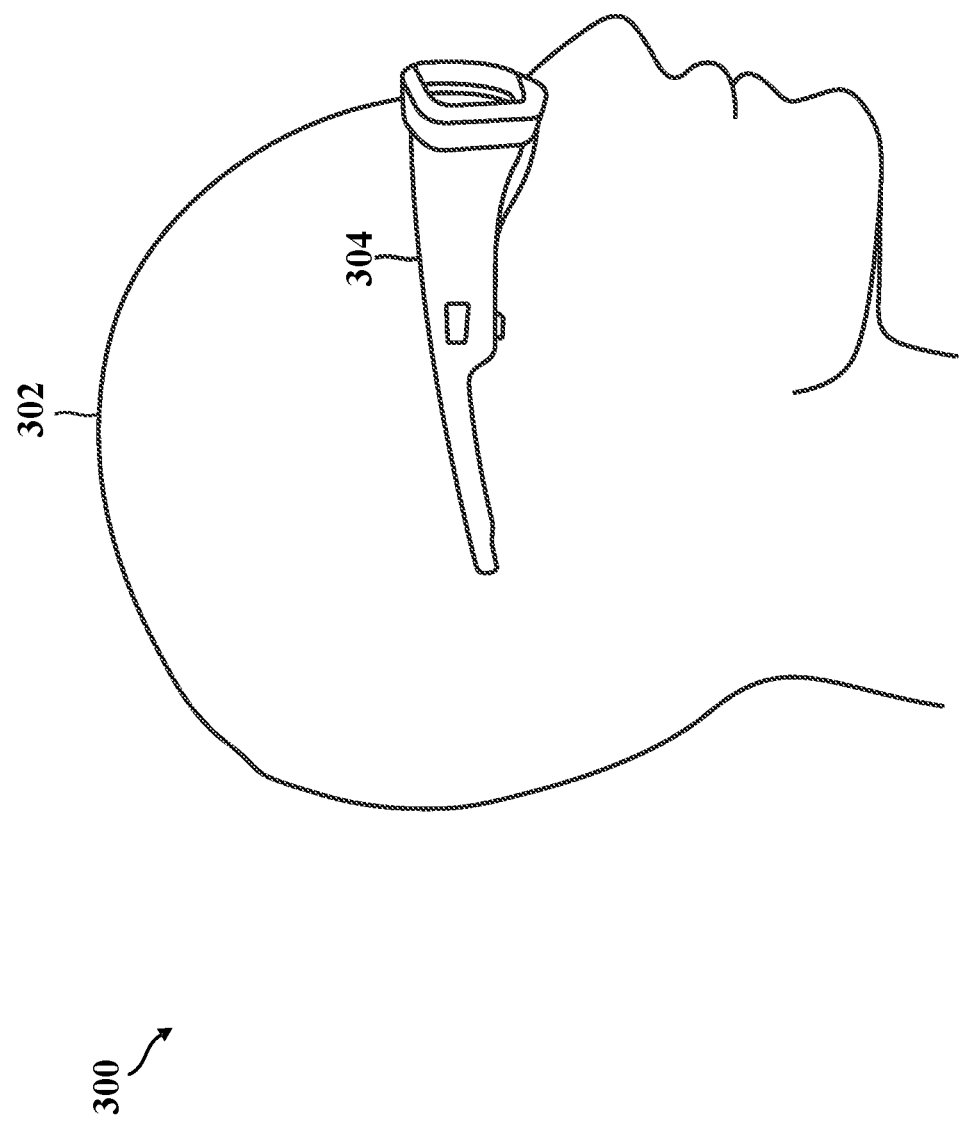
FIG. 3 is a diagram illustrating a virtual reality (VR)/augmented reality (AR) headset utilized by a person in connection with a theremin-based tracking system according to an aspect of the present disclosure.

FIG. 3 is a diagram 300 illustrating a virtual reality (VR)/augmented reality (AR) headset 304 utilized by a person 302 in connection with a theremin-based tracking system according to an aspect of the present disclosure. In some aspects, the person 302 is sitting in the seat 202 of the ride vehicle 200 of FIG. 2. In an aspect, the headset 304 includes an inertial measurement unit (IMU) facilitating directional positioning based on where the person's head is pointed (where the person is looking). The theremin-based tracking system may be used as a velocity trigger system. For example, the theremin-based hand tracking system (e.g., using a theremin circuit and a signal processor) may determine a velocity of the person's hand movement from point A to point B. Based on the hand velocity information, the signal processor coupled to the theremin circuit may calculate how fast to move an object appearing on a screen of the headset 304. In an aspect, the determined hand velocity information may also trigger other effects displayed on the headset 304, e.g., a laser beam, a ball throw, an element to move on the screen at a certain speed, etc.

In an example implementation, the person 302 wears the headset 304 and observes a video game displayed on the screen of the headset 304. Within the video game, the person 302 is to throw a virtual ball by physically moving an arm/hand in a throwing motion. The theremin-based tracking system coupled to the headset 304 may determine how hard the person 302 throws the ball to create a velocity arc (the display of how the virtual ball travels) in the video game. The theremin-based tracking system may also determine if the throw was a short throw or a long throw. In an aspect, the theremin-based tracking system may determine how fast an object (e.g., person's hand) moves through the theremin field. The ability to determine the velocity of the object allows the system to gather information about how a person moves through the theremin field (not only the position of the person's hand in the theremin field) to, e.g., trigger the virtual ball throw. For example, the gathered information may be fed into the game, which is then used to generate the virtual ball onto the screen of the headset 304, and further used to eventually throw the virtual ball in the virtual world.

In an aspect, either one of the frequency antenna or the amplitude antenna of the theremin-based tracking system may be used to determine a velocity of the person's hand movement. Using the frequency antenna as an example, if the person 302 performs a chopping hand motion over the top of the frequency antenna, the frequency will increase as the person's hand moves closer to the frequency antenna, thus creating narrower waves. The frequency will decrease as the person's hand moves farther away from the frequency antenna, thus creating wider waves. A rate of change from a narrow wave to a wide wave (or vice versa) is the velocity at which the person's hand moves through the field. So as the person's hand chops down toward the frequency antenna, the rate of change from the narrow wave to the wide wave (or vice versa) may determine the velocity of the hand movement.

Using the amplitude antenna as an example, if the person 302 performs the chopping hand motion over the top of the amplitude antenna, the amplitude will increase as the person's hand moves closer to the amplitude antenna, thus creating taller waves. The amplitude will decrease as the person's hand moves farther away from the amplitude antenna, thus creating shorter waves. A rate of change from a tall wave to a short wave (or vice versa) is the velocity at which the person's hand moves through the field. So as the person's hand chops down toward the amplitude antenna, the rate of change from the tall wave to the short wave (or vice versa) may determine the velocity of the hand movement.

In an aspect, one antenna of the theremin-based tracking system may track one hand of the person 302 and the other antenna of the tracking system may track the other hand of the person 302. For example, the lap bar 210 of the ride vehicle 200 may be implemented with the theremin-based tracking system, wherein one antenna may extend to the left side of the lap bar 210 to track the left-hand movement of the person sitting in the seat 202 and another antenna may extend to the right side of the lap bar 210 to track the right-hand movement of the person. The antenna tracking the left-hand movement may determine left-hand velocity via changes in amplitude and the antenna tracking the right-hand movement may determine right-hand velocity via changes in frequency, or vice versa.

In an aspect, the two antennas of the theremin-based tracking system operate independently of each other. Manipulation of the frequency antenna does not affect the amplitude antenna, and vice versa. Depending on the arrangement of the antennas, and because a calibration process for filtering out external stimuli from the antennas (as will be described below) is present in the theremin-based tracking system, one antenna can track changes in the wave for one hand (e.g., track changes in the amplitude of the wave based on left-hand movement) and the other antenna can track changes in the wave for the other hand (e.g., track changes in frequency of the wave based on right-hand movement). Accordingly, the theremin-based tracking system may determine velocity from both hands independently of each other. For example, the person 302 may perform a throw with the right hand and the theremin-based tracking system will read the change in frequency to determine the velocity of the right-hand throw. Alternatively, the person 302 may perform a throw with the left hand and the theremin-based tracking system will read the change in amplitude to determine the velocity of the left-hand throw. Moreover, because the two antennas are independent of each other, the person 302 can perform both the left-hand throw and the right-hand throw at the same time, or at different rates, and the theremin-based tracking system will be able to determine the velocities of the throws from one hand independent from the throws of the other hand.

As described above, the lap bar 210 may be implemented with one theremin-based tracking system having two antennas that operate independently of each other. However, in an aspect, the lap bar 210 may be implemented with multiple theremin-based tracking systems that operate independently of each other. The multiple theremin-based tracking systems may work separately to track multiple larger areas. For example, one theremin-based tracking system may track hand movement on the left side of the lap bar 210 and another theremin-based tracking system may track hand movement on the right side of the lap bar 210. Antennas of one tracking system may be separated from antennas of the other tracking system by a grounding barrier (e.g., wire mesh pulled to ground) to isolate signals emanating from a respective tracking system. Accordingly, both left-hand movements and right-hand movements of the person may be tracked by either of the two tracking systems implemented in the lap bar 210.

In an example implementation, the person 302 wears the headset 304 and observes a video game displayed on a screen of the headset 304. Within the video game, the person 302 rides a virtual motorcycle (or other object). In the real world, the person 302 may hold a physical stick with a handle made of metal or any other conductive material. The physical stick handle may be configured to be an antenna of a theremin-based tracking system. Accordingly, as the person's hands get closer to or farther from the physical stick handle, the tracking system can distinguish a direction of hand movement, and further output signals (via a signal processor) to the video game to show the person's hands in game getting closer to or farther from the virtual motorcycle based on the position of the person's hands on the physical stick handle.

In general, gestures may be realized. The theremin-based tracking system may detect a swipe gesture or any number of movements from the person 302 to enable an effect. For example, the theremin-based tracking system may detect where the person 302 is grabbing the physical stick handle and output signals (via the signal processor) to the video game to show the person's hands in game grabbing the virtual motorcycle in the same position where the person 302 grabs the physical stick handle.

In another example, the theremin-based tracking system may detect how far forward the person's hands are on the physical stick handle, and consequently, determine how far forward the person is physically leaning (via the change in frequency or amplitude of a wave). In an aspect, the tracking system may include additional sensor circuitry to determine how far forward the person is physically leaning based on the height of the person. The tracking system may then output corresponding signals (via the signal processor) to the video game to control the speed of the virtual motorcycle in game. Here, how far forward the person 302 places his/her hand on the physical stick handle (detected by the tracking system) impacts how fast the person 302 travels on the virtual motorcycle in game.

In another example implementation, the theremin-based tracking system is implemented on the lap bar 210 of the ride vehicle 200. The person's hands are generally on top of the lap bar 210. If the person lifts his/her hand up and performs a throwing motion over the top of the lap bar 210, the tracking system can measure how fast the hand travels through the theremin field via the change (delta) in the frequency of the wave (or the amplitude of the wave). Using the measurements, the tracking system (via the signal processor) can then generate a ball throw velocity for use in a game being observed through the headset 304. In an aspect, the headset 304 is used as a separate tracking system to determine a direction of the ball throw, not the velocity at which the ball is thrown. The theremin-based tracking system tracks the person's hand, which controls the velocity of the ball throw. The direction of the ball throw is tracked by the headset 304 depending on where the person's head is pointed (or where the person's eyes are looking).

As discussed above, the theremin-based tracking system (e.g., antennas, theremin circuit, and signal processor) is implemented on the lap bar 210 of the ride vehicle 200. However, in some aspects, the theremin-based tracking system may also be implemented in the headset 304. Accordingly, the velocity of hand movement may also be determined based on the person moving his/her hands in proximity to the headset 304.

In an aspect, the theremin-based tracking system (e.g., theremin circuit and signal processor) may approximately have a length of 100-200 mm, a width of 50-100 mm, and a thickness of 2-20 mm. The size of the antennas of the tracking system may depend on the type of conductive material used (e.g., copper tape may be used as an antenna). In an aspect, an entire theremin-based tracking system may be made of just a circuit board and an antenna, wherein the antenna may be the lap bar 210 of the ride vehicle 200. Thus, the hand tracking system may be a combination of the circuit board coupled to the lap bar 210 and changes in frequency or amplitude of a wave may be measured relative to the lap bar 210.

In an aspect, the theremin-based tracking system may include a calibration sequence where the system detects an environment the device is currently in and filters all frequencies that currently interfere with the system. Accordingly, the system only senses new medium or motion that is added to (or interfering with) the field. Such a calibration sequence ensures that the environment does not interfere with the theremin-based tracking system. That is, the theremin-based tracking system ensures that changes sensed by the system are due to the person and not the environment.

Figure 4:
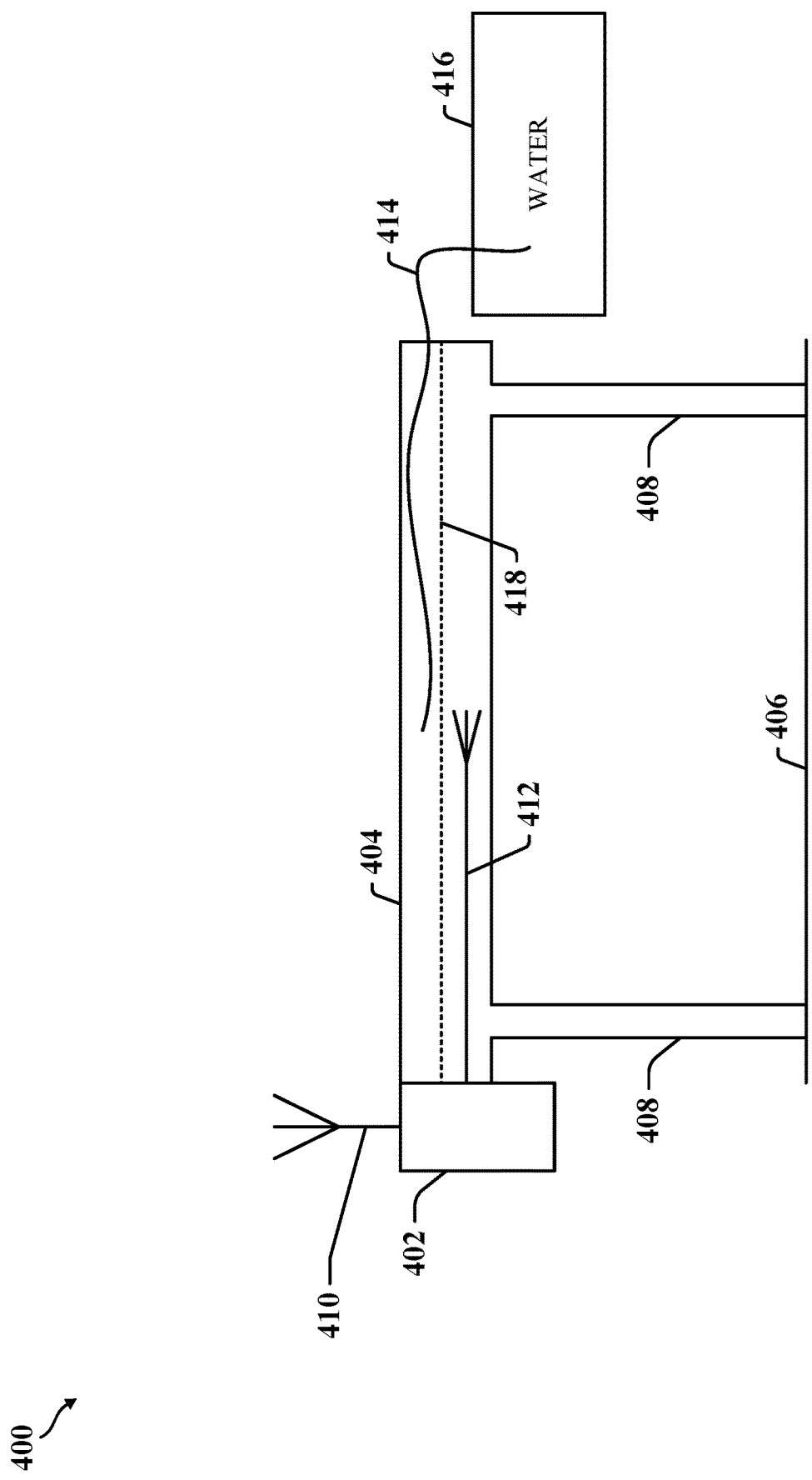
FIG. 4 illustrates a theremin-based tracking system implementing wireless triggering according to an aspect of the present disclosure.

FIG. 4 illustrates a theremin-based tracking system 400 implementing wireless triggering according to an aspect of the present disclosure. In an aspect, the system 400 may include a theremin circuit 402 (including a signal processor) coupled to a lap bar 404 of a ride vehicle. The lap bar 404 may extend from a ride vehicle floor 406 via support bars 408. For simplicity, the ride vehicle and a seat of the ride vehicle are not shown.

The system 400 may also include a first antenna 410 extending vertically from the theremin circuit 402 and a second antenna 412 extending horizontally from the theremin circuit 402 within the lap bar 404. The system 400 may further include a wire or cable 414 made of a conductive material (e.g., HDMI cable, Ethernet cable, etc.) running in parallel to the first antenna 410 and the second antenna 412. The wire or cable 414 may or may not be housed within the lap bar 404. Attenuation from the first antenna 410 or the second antenna 412 allows the wire or cable 414 in parallel to act as an extension of an antenna. Because the wire or cable 414 used as the antenna extension is not directly (or electrically) coupled to an electronic portion of the system 400 (i.e., the wire or cable 414 is not directly attached to either of the antennas 410, 412 or the theremin circuit 402), the wire or cable 414 may perform as a wireless trigger of the system 400. Accordingly, a person touching or moving his/her hand near the wire or cable 414 will trigger the theremin circuit 402 to output a signal having a varying frequency or amplitude.

In an aspect, the wire or cable 414 may be placed in a water medium 416 (e.g., bucket, bowl, or any other container capable of holding water) filled with water. As such, while the wire or cable 414 is submerged within the water, the water medium 416 may also perform as a wireless trigger of the system 400 via the cable 414. A person touching, or moving his/her hand near, the water medium 416 will trigger the theremin circuit 402 to output a signal having a varying frequency or amplitude.

Upon being triggered by either of the wire or cable 414 or the water medium 416, the system 400 (via the theremin circuit and the signal processor) may output digital data usable for different applications, such as data used to trigger a safety system, output game movement on a screen, activate an interactive element of a ride vehicle or other attraction, or trigger and effect from an effects engine.

In an aspect, both the first antenna 410 and the second antenna 412 are separated/insulated from the wire or cable 414 by an insulative material. The insulative material prevents electricity from conducting through the wire or cable 414. For example, the lap bar 404 may be made of an insulative material (e.g., plastic). Accordingly, if the wire or cable 414 is housed in the lap bar 404, then the first antenna 410 is insulated from the wire or cable 414 via an outer wall (e.g., plastic wall) of the lap bar 404. Moreover, to insulate the second antenna 412 from the wire or cable 414, which may be both housed in the lap bar 404, the second antenna 412 and the wire or cable 414 may be separated within the lap bar 404 by an inner wall 418 made of an insulative material (e.g., plastic).

The wire or cable 414 being insulated from both of the antennas 410, 412 and the theremin circuit 402 (including the signal processor) creates a wireless button (or trigger) having a negligible amount of electricity running through it. In an aspect, when the wire or cable 414 is inserted into the water medium 414 filled with water, and a person touches, or moves his/her hand near, the water medium 414, the water medium 414 manipulates the frequency (or amplitude) of a wave, thus becoming a wireless button (or trigger) having no measurable electricity running through the water medium 416 or the wire or cable 414. The wireless button only changes the attenuation of the system 400. Notably, the provision of wireless triggering in the system 400 is desirable since it does not require the introduction of electricity into a body of water. By utilizing wireless attenuation through a non-conductive material, the theremin-based tracking system can monitor the body of water without having to send a voltage through it, thus creating a safer system.

Notably, the water medium 416 is not necessary to create the wireless button/enable wireless triggering of the tracking system. A person touching, or moving his/hand near, the wire or cable 414 alone is sufficient to manipulate the frequency (or amplitude) of the wave, and thus, create the wireless button/enable wireless triggering of the tracking system.

In an aspect, the wireless button (or trigger) may be used in an interactive attraction (e.g., a water-based interactive, such as shooting a water cannon). For example, in an interactive water splash zone, persons can safely interact with various water mediums, since there is no measurable physical electricity running through the wire or cable 414. In another example, the wireless trigger may be implemented in a pool (e.g., for a water park) to make the pool interactive. For example, when a person jumps into the pool, the wireless trigger may activate a special effect (e.g., water cannon shooting). In an aspect, the water in the pool may act as the antenna of the wireless trigger. The rate (velocity) at which a person jumping from a diving board and entering the pool may be detected based on the person's movement respective to the water. Accordingly, different types of effects may be activated based on the person's velocity. For example, the wireless trigger (via the theremin-based tracking system) may cause a water cannon to shoot water or cause a water jet system to make the person's splash appear bigger based on how fast the person enters the water. In another example, the wireless trigger (via the theremin-based tracking system) may cause a lighting effect, smoke effect, or any other type of effect to be activated based on the velocity of the person entering the water. In an aspect, touching the wireless trigger is not necessary to activate an effect. For example, any of the effects described above may be activated by a person placing his/her hand near (but not touching) the wireless trigger.

In an aspect, a wireless trigger (utilizing a theremin-based tracking system) may be implemented as a musical instrument using a water medium (e.g., water drum). For example, a theremin-based tracking system may be configured to operate with a bucket of water as a wireless trigger. Accordingly, when a person smacks, hits, or touches the water within the bucket, the theremin-based tracking system will be triggered to output a signal to a loudspeaker or some other type of audio processing circuit/device to generate a sound or musical note. A velocity at which the person's hand touches the water may determine a volume of the generated sound or musical note.

In an aspect, the theremin-based tracking system may be implemented in various types of safety systems. For example, when the theremin-based tracking system is triggered (detects hand or body movement), the tracking system may output a signal to enable a safety system. In some aspects, the tracking system may output an analog signal (e.g., voltage) to an analog-based safety system.

In an aspect, the safety system may be a detection system. For example, if a person riding in a seat of a ride vehicle is ejected from, or somehow leaves the seat during the ride, the safety system (via the theremin circuit) may detect that the person is out of the seat and output a signal to stop the ride. The safety system may detect a physical presence of any body part, or an entire body, depending on how the system is implemented.

In an aspect, the theremin-based tracking system may be implemented as a person tracker. In particular, the tracking system may track if a person is sitting in a ride seat or if a person is walking through a doorway and output a corresponding signal to another system. For example, when a person walks through a doorway, the tracking system may be triggered to output a response to another system or device to enable, e.g., an animated figure, a light emitting diode (LED), a safety system, an alarm, etc.

In an aspect, the theremin-based tracking system may be implemented in a safety system or alarm system for a pool. For example, if a person falls into the pool, the tracking system may be triggered to output an emergency notification signal to a safety system. In another example, a pool may be closed to the public during certain hours (e.g., during the evening). Accordingly, detection of an unauthorized person in the pool may trigger the tracking system to output an alarm signal to an alarm system.

Figure 5:
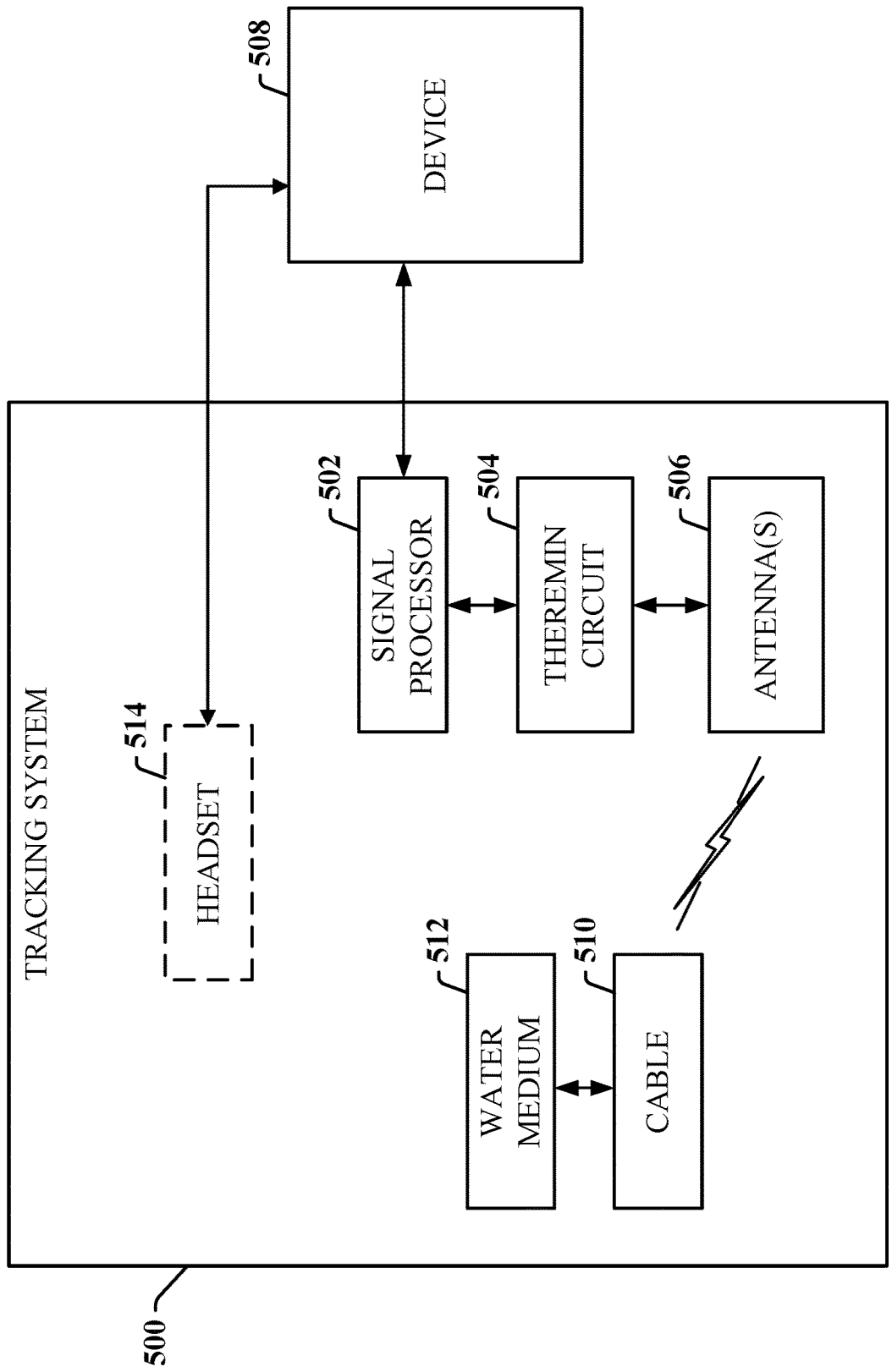
FIG. 5 is a block diagram illustrating an example theremin-based tracking system for tracking a presence and/or motion of a body part according to an aspect of the present disclosure.

FIG. 5 is a block diagram illustrating an example theremin-based tracking system 500 for tracking a presence and/or motion of a body part (e.g., person's hand) according to an aspect of the present disclosure. The tracking system 500 includes a signal processor 502 and a theremin circuit 504 including at least one antenna 506 (e.g., frequency antenna and/or amplitude antenna).

The theremin circuit 504 detects a varying position of a body part (e.g., person's hand or other body part) relative to the at least one antenna 506. Moreover, the theremin circuit 504 outputs to the signal processor 502 an analog signal having a varying frequency or amplitude based on the varying position of the body part relative to the at least one antenna 506.

The signal processor 502 determines a rate of change of the varying frequency or amplitude of the analog signal and determines at least a velocity of the body part (e.g., velocity of the person's hand movement) based on the rate of change. The signal processor 502 then outputs a digital signal corresponding to at least the velocity to another system or device 508 coupled to the signal processor.

In an aspect, the signal processor 502 determines an accretion of the body part based on the rate of change. Accordingly, the digital signal output from the signal processor 502 may further correspond to the accretion.

In a further aspect, the signal processor 502 may determine an acceleration, a jerk, and/or a jounce of the body part based on the velocity. Accordingly, the digital signal output from the signal processor 502 may also correspond to the acceleration, the jerk, or the jounce.

In an aspect, the digital signal is output to the system or device 508 to control a moving element of a video game, trigger an interactive element of an attraction, and/or trigger an alarm or safety system.

In an aspect, the signal processor 502 and the theremin circuit 504 are coupled to a lap bar (e.g., lap bar 210) of a ride vehicle, and the at least one antenna is housed within the lap bar. Accordingly, the theremin circuit 504 may detect the varying position of the body part relative to the lap bar.

In an aspect, the at least one antenna 506 is housed within a headset (e.g., headset 304) configured to be worn by a person operating the tracking system 500. Accordingly, the theremin circuit 504 may detect the varying position of the body part relative to the headset.

The tracking system 500 may further include a cable 510 (e.g., wire or cable 414) made of a conductive material and positioned in parallel to the at least one antenna 506. The cable 506 is insulated from the signal processor 502, the theremin circuit 504, and the at least one antenna 506 via an insulative material. Moreover, the at least one antenna 506 wirelessly attenuates to the cable 510. Accordingly, the theremin circuit 504 may detect the varying position of the body part relative to the cable 510.

The tracking system 500 may also include a water medium 512 (e.g., water medium 416) filled with water, wherein the cable 510 is inserted in the water medium 512 and the at least one antenna 506 wirelessly attenuates to the cable 510 inserted in the water medium 512. Accordingly, the theremin circuit 504 may detect the varying position of the body part relative to the water medium 512.

The tracking system 500 may also include a headset 514 configured to be worn by a person operating the tracking system 500. The headset 514 may detect spatial coordinates corresponding to a field of view of the person. The headset 514 may further output the spatial coordinates to the other system or device 508 coupled to the signal processor 502. The spatial coordinates may be used in connection with the digital signal output from the signal processor 502 (e.g., the digital signal and the spatial coordinates are output to a video game and jointly used to determine a velocity and direction/location of a ball throw).

Figure 6:
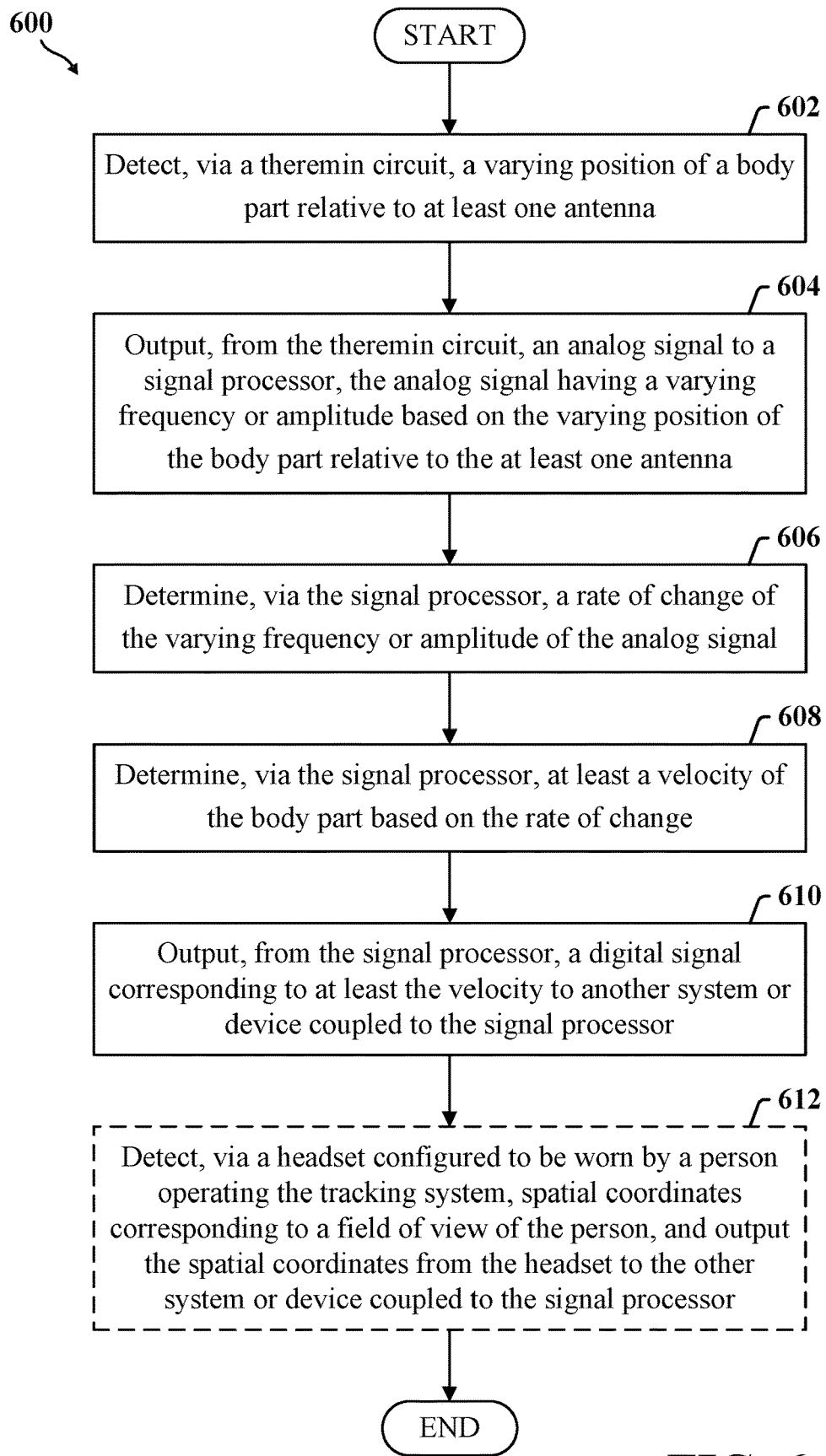
FIG. 6 is a flow chart illustrating an exemplary process for tracking a presence and/or motion of a body part using a theremin-based tracking system according to an aspect of the present disclosure.

FIG. 6 is a flow chart illustrating an exemplary process 600 for tracking a presence and/or motion of a body part (e.g., person's hand) using a theremin-based tracking system according to an aspect of the present disclosure. In some examples, the process 600 may be carried out by the theremin-based tracking system 500 or any suitable apparatus or means for carrying out the functions or algorithm described below.

At 602, the system may detect, via a theremin circuit (e.g., theremin circuit 504), a varying position of a body part relative to at least one antenna (e.g., antenna(s) 506). The body part may be a person's hand or any other body part of the person.

At 604, the system may output, from the theremin circuit, an analog signal to a signal processor (e.g., signal processor 502). The analog signal has a varying frequency or amplitude based on the varying position of the body part relative to the at least one antenna.

At 606, the system may determine, via the signal processor, a rate of change of the varying frequency or amplitude of the analog signal. At 608, the system may determine, via the signal processor, at least a velocity of the body part based on the rate of change. Thereafter, at 610, the system may output, from the signal processor, a digital signal corresponding to at least the velocity to another system or device (e.g., system or device 508) coupled to the signal processor.

In an aspect, at 608, the system may also determine, via the signal processor, an accretion of the body part based on the rate of change. Accordingly, at 610, the digital signal output from the signal processor may further correspond to the accretion.

In a further aspect, at 608, the system may determine, via the signal processor, an acceleration, a jerk, and/or a jounce of the body part based on the velocity. Accordingly, at 610, the digital signal output from the signal processor may also correspond to the acceleration, the jerk, or the jounce.

At 612, the system may optionally detect, via a headset (e.g., headset 514) configured to be worn by a person operating the system, spatial coordinates corresponding to a field of view of the person. The system may further output the spatial coordinates from the headset to the other system or device coupled to the signal processor, wherein the spatial coordinates are used in connection with the digital signal output from the signal processor (e.g., the digital signal and the spatial coordinates are output to a video game and jointly used to determine a velocity and direction/location of a ball throw).

In an aspect, the digital signal is output to control a moving element of a video game, trigger an interactive element of an attraction, and/or trigger an alarm or safety system.

In an aspect, the signal processor and the theremin circuit are coupled to a lap bar (e.g., lap bar 210) of a ride vehicle, wherein the at least one antenna is housed within the lap bar. Accordingly, the theremin circuit may perform detection by detecting the varying position of the body part relative to the lap bar.

In an aspect, the at least one antenna is housed within a headset (e.g., headset 304) configured to be worn by a person operating the system. Accordingly, the theremin circuit may perform detection by detecting the varying position of the body part relative to the headset.

In an aspect, a cable (e.g., cable 414 or 510) made of a conductive material is positioned in parallel to the at least one antenna. Moreover, the cable is insulated from the theremin circuit, the signal processor, and the at least one antenna, and the at least one antenna wirelessly attenuates to the cable. Accordingly, the theremin circuit may perform detection by detecting the varying position of the body part relative to the cable.

In an aspect, the cable is inserted in a water medium (e.g., water medium 416 or 512) filled with water and the at least one antenna wirelessly attenuates to the cable inserted in the water. Accordingly, the theremin circuit may perform detection by detecting the varying position of the body part relative to the water medium.

Within the present disclosure, the word "exemplary" is used to mean "serving as an example, instance, or illustration." Any implementation or aspect described herein as "exemplary" is not necessarily to be construed as preferred or advantageous over other aspects of the disclosure. Likewise, the term "aspects" does not require that all aspects of the disclosure include the discussed feature, advantage, or mode of operation. The term "coupled" is used herein to refer to the direct or indirect coupling between two objects. For example, if object A physically touches object B, and object B touches object C, then objects A and C may still be considered coupled to one another-even if they do not directly physically touch each other. For instance, a first object may be coupled to a second object even though the first object is never directly physically in contact with the second object.

One or more of the components, steps, features and/or functions illustrated in FIGS. 1-6 may be rearranged and/or combined into a single component, step, feature, or function or embodied in several components, steps, or functions. Additional elements, components, steps, and/or functions may also be added without departing from novel features disclosed herein. The apparatus, devices, and/or components illustrated in FIGS. 1-6 may be configured to perform one or more of the methods, features, or steps described herein. The novel algorithms described herein may also be efficiently implemented in software and/or embedded in hardware.

It is to be understood that the specific order or hierarchy of steps in the methods disclosed is an illustration of exemplary processes. Based upon design preferences, it is understood that the specific order or hierarchy of steps in the methods may be rearranged. The accompanying method claims present elements of the various steps in a sample order, and are not meant to be limited to the specific order or hierarchy presented unless specifically recited therein.

The previous description is provided to enable any person skilled in the art to practice the various aspects described herein. Various modifications to these aspects will be readily apparent to those skilled in the art, and the generic principles defined herein may be applied to other aspects. Thus, the claims are not intended to be limited to the aspects shown herein, but are to be accorded the full scope consistent with the language of the claims, wherein reference to an element in the singular is not intended to mean "one and only one" unless specifically so stated, but rather "one or more." Unless specifically stated otherwise, the term "some" refers to one or more. A phrase referring to "at least one of" a list of items refers to any combination of those items, including single members. As an example, "at least one of: a, b, or c" is intended to cover: a; b; c; a and b; a and c; b and c; and a, b, and c. All structural and functional equivalents to the elements of the various aspects described throughout this disclosure that are known or later come to be known to those of ordinary skill in the art are expressly incorporated herein by reference and are intended to be encompassed by the claims. Moreover, nothing disclosed herein is intended to be dedicated to the public regardless of whether such disclosure is explicitly recited in the claims. No claim element is to be construed under the provisions of 35 U.S.C. § 112(f) unless the element is expressly recited using the phrase "means for" or, in the case of a method claim, the element is recited using the phrase "step for."

What is claimed is:

1. A theremin-based tracking system, comprising:
   a signal processor; and
   a theremin circuit including at least one antenna, the theremin circuit configured to:
      detect a varying position of a body part relative to the at least one antenna, and
      output to the signal processor an analog signal having a varying frequency or amplitude based on the varying position of the body part relative to the at least one antenna, wherein the signal processor is configured to:
         determine a rate of change of the varying frequency or amplitude of the analog signal,
         determine at least a velocity of the body part based on the rate of change, and
         output a digital signal corresponding to at least the velocity to another system or device coupled to the signal processor.

2. The theremin-based tracking system of claim 1, wherein the digital signal is output to control a moving element of a video game.

3. The theremin-based tracking system of claim 1, wherein the digital signal is output to trigger an interactive element of an attraction.

4. The theremin-based tracking system of claim 1, wherein the digital signal is output to trigger an alarm or safety system.

5. The theremin-based tracking system of claim 1, wherein the signal processor and the theremin circuit are coupled to a lap bar of a ride vehicle, and wherein the at least one antenna is housed within the lap bar.

6. The theremin-based tracking system of claim 5, wherein the theremin circuit is configured to detect the varying position of the body part relative to the lap bar.

7. The theremin-based tracking system of claim 1, wherein the at least one antenna is housed within a headset configured to be worn by a person operating the theremin-based tracking system.

8. The theremin-based tracking system of claim 7, wherein the theremin circuit is configured to detect the varying position of the body part relative to the headset.

9. The theremin-based tracking system of claim 1, further comprising:
   a cable made of a conductive material and positioned in parallel to the at least one antenna,
   wherein the cable is insulated from the theremin circuit, the signal processor, and the at least one antenna, and
   wherein the at least one antenna wirelessly attenuates to the cable.

10. The theremin-based tracking system of claim 9, wherein the theremin circuit is configured to detect the varying position of the body part relative to the cable.

11. The theremin-based tracking system of claim 9, further comprising:
    a water medium filled with water,
    wherein the cable is inserted in the water medium, and
    wherein the at least one antenna wirelessly attenuates to the cable inserted in the water medium.

12. The theremin-based tracking system of claim 11, wherein the theremin circuit is configured to detect the varying position of the body part relative to the water medium.

13. The theremin-based tracking system of claim 1, wherein the signal processor is further configured to:
    determine an accretion of the body part based on the rate of change,
    wherein the digital signal further corresponds to the accretion.

14. The theremin-based tracking system of claim 1, wherein the signal processor is further configured to:
    determine at least one of an acceleration, a jerk, or a jounce of the body part based on the velocity,
    wherein the digital signal further corresponds to the at least one of the acceleration, the jerk, or the jounce.

15. The theremin-based tracking system of claim 1, further comprising:
    a headset configured to be worn by a person operating the theremin-based tracking system, wherein the headset is configured to:
       detect spatial coordinates corresponding to a field of view of the person, and
       output the spatial coordinates from the headset to the other system or device coupled to the signal processor, wherein the spatial coordinates are used in connection with the digital signal output from the signal processor.

16. A method of tracking a body part using a theremin-based tracking system, comprising:
    detecting, via a theremin circuit, a varying position of a body part relative to at least one antenna;
    outputting, from the theremin circuit to a signal processor, an analog signal having a varying frequency or amplitude based on the varying position of the body part relative to the at least one antenna;

determining, via the signal processor, a rate of change of the varying frequency or amplitude of the analog signal;

determining, via the signal processor, at least a velocity of the body part based on the rate of change; and outputting, from the signal processor, a digital signal corresponding to at least the velocity to another system or device coupled to the signal processor.

17. The method of claim 16, wherein the digital signal is output to control a moving element of a video game.

18. The method of claim 16, wherein the digital signal is output to trigger an interactive element of an attraction.

19. The method of claim 16, wherein the digital signal is output to trigger an alarm or safety system.

20. The method of claim 16,
    wherein the signal processor and the theremin circuit are coupled to a lap bar of a ride vehicle,
    wherein the at least one antenna is housed within the lap bar, and
    wherein the detecting includes detecting the varying position of the body part relative to the lap bar.

21. The method of claim 16,
    wherein the at least one antenna is housed within a headset configured to be worn by a person operating the theremin-based tracking system, and
    wherein the detecting includes detecting the varying position of the body part relative to the headset.

22. The method of claim 16,
    wherein a cable made of a conductive material is positioned in parallel to the at least one antenna,
    wherein the cable is insulated from the theremin circuit, the signal processor, and the at least one antenna,
    wherein the at least one antenna wirelessly attenuates to the cable, and
    wherein the detecting includes detecting the varying position of the body part relative to the cable.

23. The method of claim 22,
    wherein the cable is inserted in a water medium filled with water,
    wherein the at least one antenna wirelessly attenuates to the cable inserted in the water, and
    wherein the detecting includes detecting the varying position of the body part relative to the water medium.

24. The method of claim 16, further comprising:
    determining, via the signal processor, an accretion of the body part based on the rate of change,
    wherein the digital signal further corresponds to the accretion.

25. The method of claim 16, further comprising:
    determining, via the signal processor, at least one of an acceleration, a jerk, or a jounce of the body part based on the velocity,
    wherein the digital signal further corresponds to the at least one of the acceleration, the jerk, or the jounce.

26. The method of claim 16, further comprising:
    detecting, via a headset configured to be worn by a person operating the theremin-based tracking system, spatial coordinates corresponding to a field of view of the person; and
    outputting the spatial coordinates from the headset to the other system or device coupled to the signal processor, wherein the spatial coordinates are used in connection with the digital signal output from the signal processor.

* * * * *